United States Patent [19]
Kitamura

[11] Patent Number: 6,021,249
[45] Date of Patent: Feb. 1, 2000

[54] METHOD AND APPARATUS FOR PROCESSING A PICTURE SIGNAL HAVING MEANS FOR VARYING A QUANTIZATION CHARACTERISTIC TO PRODUCE EQUAL-SIZED SYNC BLOCKS

[75] Inventor: Takuya Kitamura, Kanagawa, Japan

[73] Assignee: Sony Corporation, Tokyo, Japan

[21] Appl. No.: 08/547,661

[22] Filed: Oct. 24, 1995

[30] Foreign Application Priority Data

Oct. 26, 1994 [JP] Japan ..................................... 6-287572

[51] Int. Cl.⁷ ....................................................... H04N 5/92
[52] U.S. Cl. .............................. 386/33; 386/40; 386/112; 386/124; 348/391
[58] Field of Search .................................. 386/33, 34, 40, 386/109, 111, 112, 124; 360/32, 48; 348/405, 409–412, 420–421, 390–391; H04N 5/92, 9/79, 11/02, 5/917, 7/26, 7/52, 5/926

[56] References Cited

U.S. PATENT DOCUMENTS

| | | | |
|---|---|---|---|
| 5,301,018 | 4/1994 | Smidth et al. | 348/420 |
| 5,488,482 | 1/1996 | Ueda et al. | 386/111 |
| 5,521,898 | 5/1996 | Ogasawara | 369/124 |
| 5,537,215 | 7/1996 | Niimura et al | 386/111 |
| 5,543,845 | 8/1996 | Asamura et al. | 348/407 |
| 5,550,640 | 8/1996 | Tsuboi et al. | 360/31 |
| 5,557,420 | 9/1996 | Yanagihara et al. | 360/32 |

*Primary Examiner*—Thai Tran
*Attorney, Agent, or Firm*—Frommer Lawrence & Haug, LLP.; William S. Frommer

[57] ABSTRACT

A system for processing a picture signal, compression coding the picture signal in units of macro-blocks and packeting the compressed picture data into sync blocks for transmission or recording of the picture signal, in which a plurality of sub-blocks Y(0–3), R–Y, and B–Y contained in the same macro-blocks MB0–MB3 are distributed to different sync blocks #0–#3 and, by forming such sync blocks #0–#3, blocks difficult to quantize and blocks easy to quantize can be dispersedly distributed to the sync blocks #0–#3 in fine units and, thereby, the sync blocks #0–#3 can be averaged so as to have flatness at a high level. As a result, when quantization is performed such that the quantity of data in the sync blocks #0–#3 are equal with one another, deterioration in the quality of picture due to quantization can be reduced.

6 Claims, 8 Drawing Sheets

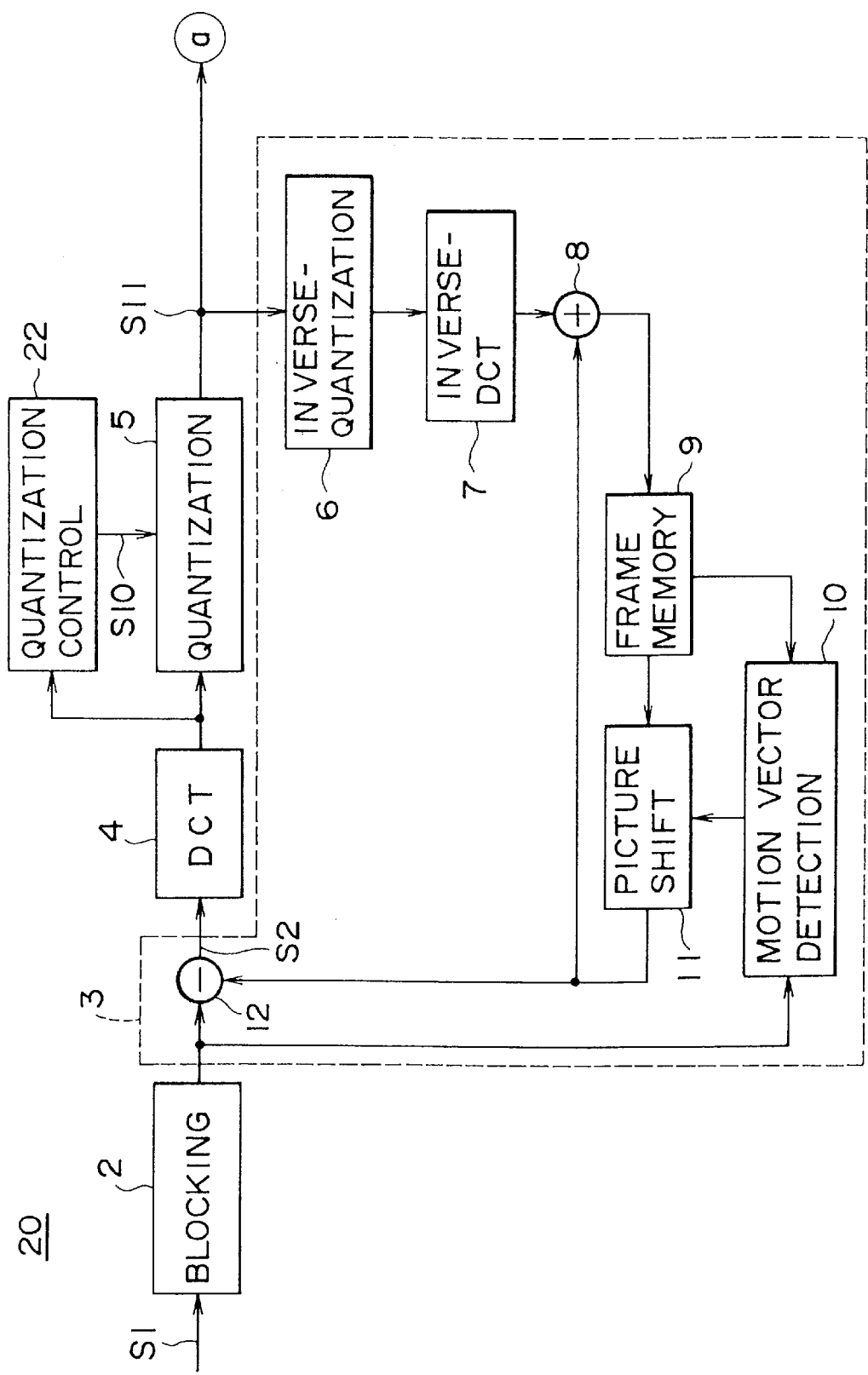

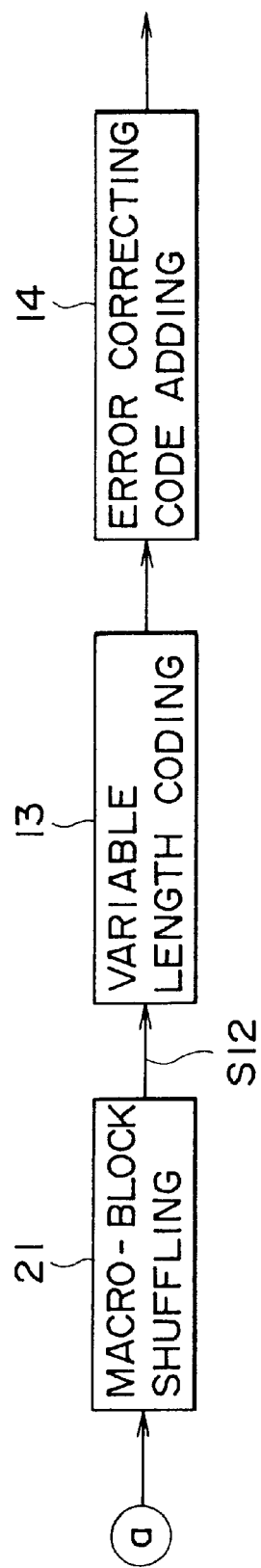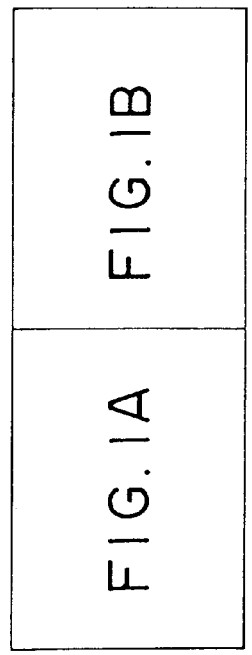

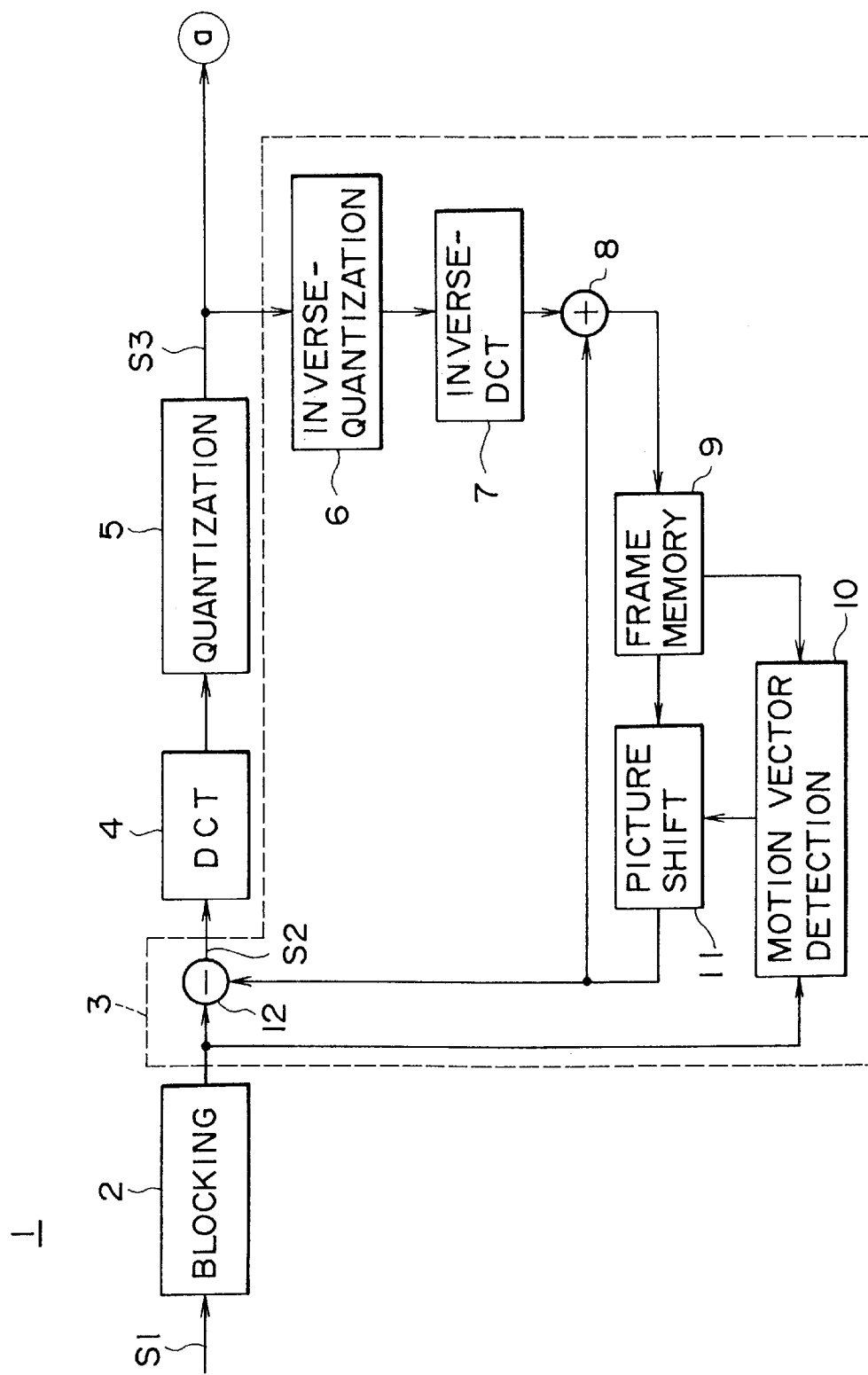

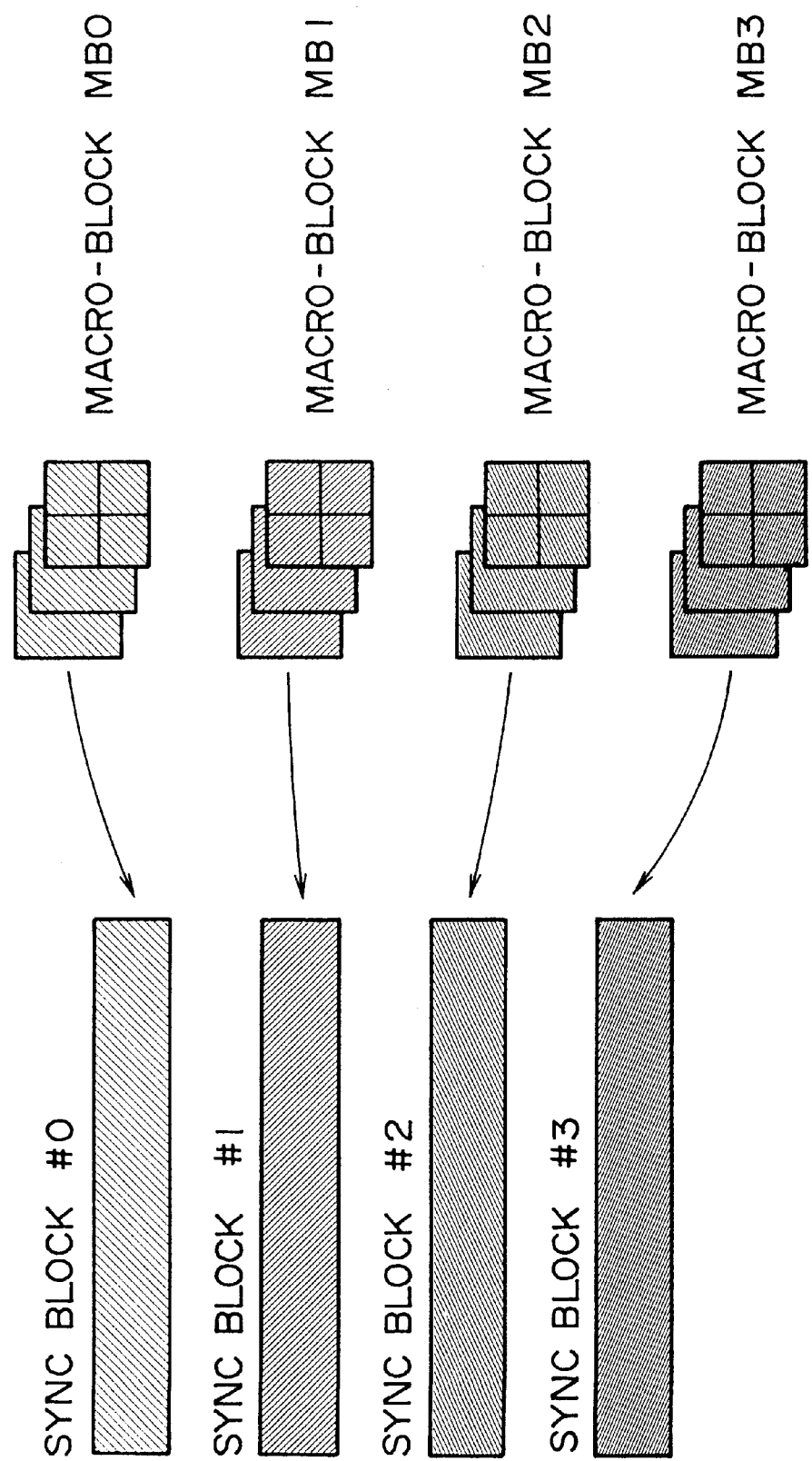

METHOD AND APPARATUS FOR PROCESSING A PICTURE SIGNAL HAVING MEANS FOR VARYING A QUANTIZATION CHARACTERISTIC TO PRODUCE EQUAL-SIZED SYNC BLOCKS

BACKGROUND OF THE INVENTION

The present invention relates to a method of processing picture signal and an apparatus for carrying out the method and more particularly to those suitably applicable to picture recording apparatuses, such as a digital video tape recorder (hereinafter called a digital VTR), recording compressed picture data packeted in units of sync blocks and picture signal transmitting apparatuses transmitting compressed picture data packeted in units of sync blocks.

There has so far been proposed a method (U.S. Pat. No. 5,021,879) as a compression coding system of a picture signal in which "motion compensation plus DCT (Discrete Cosine Transform)" processing is given to the picture signal so that an effective reduction of a large quantity of picture information is achieved.

In this compression coding method, the picture in one screen is first divided into sub-blocks (DCT blocks) as the minimum units for the compression and then a plurality of the sub-blocks are combined into a macro-block. Then, the motion vector representing the quantity of displacement between the picture of the previous frame and the picture of the incoming frame is calculated for each macro-block as the unit. The picture compensated for motion according to the motion vector is then subjected to DCT processing, quantization processing, and code word assignment processing in succession and thereby highly efficient encoding of the picture signal is achieved.

The compression coding method is characterized in that the motion vector is obtained for each macro-block as the unit and, therefore, as compared with the case where the motion vector is obtained for each sub-block as the unit, the motion vectors to be transmitted are reduced and the quantity of information to be transmitted or the quantity of information to be recorded as a whole is reduced. In the compression coding method, it is also possible, if required, to form a larger unit for processing by combining a plurality of macro-blocks together.

The "motion compensation plus DCT" processing will be described in concrete terms. Generally, there are present "spatial redundancy" and "temporal redundancy" in moving picture signals. In the case of still pictures, for example, the difference between the incoming frame and the previous frame is found to be zero. However, in most of the pictures, even when the pictures are not stationary, some constituent elements of the picture are moving with time. Therefore, by moving some part of the previous frame and the incoming frame suitably, the difference value can be decreased considerably. Such a process to produce smaller difference value by obtaining the displacement between the incoming frame and the previous frame, i.e., the motion vector, is called the "motion compensation".

At this time, the incoming frame, with respect to the previous frame, is not moving in the same direction all over the screen but directions of the motion are different from part to part, such that some part is moving down and other part is moving up. Therefore, it is practiced to divide the picture of a frame into some blocks and make the motion compensation for each block. The block as the unit for the motion compensation is the macro-block formed of a plurality of DCT blocks. The method giving the DCT processing to the thus obtained differential picture for compressing the same is the "motion compensation plus DCT" process. Thus, by transmitting DCT coefficients of the differential pictures and the motion vectors as motion information from the previous frame, the quantity of information of a picture can be reduced effectively.

In practice, the encoder employing the "motion compensation plus DCT" processing method is structured as shown in the encoder 1 of FIG. 4. An incoming picture signal S1 is input to a blocking circuit 2 and macro-blocks are formed in the blocking circuit 2 by combining a plurality of DCT blocks together. At this time, as shown in FIG. 5, the blocking circuit 2 first produces DCT blocks each thereof being formed of 8 pixels×8 lines of each of the planes of the luminance signal Y and color difference signals R–Y and B–Y and, then, produces macro-blocks by combining, for each macro-block, four adjoining DCT blocks of the luminance signal Y and one DCT block each of the color difference signals R–Y and B–Y located correspondingly to the luminance signal Y.

The encoder 1 then calculates a frame difference signal S2 between the incoming frame and the previous frame in a subsequent difference signal calculating portion 3 while making motion compensation for each macro-block as the unit. The differential signal calculating portion 3 supplies quantized data S3 output from a quantization device 5 to an adder 8 through a inverse-quantization device 6 and a inverse-DCT circuit 7. The adder 8 is also supplied with the output of a picture shift circuit 11 and, thereby, a picture signal the same as the incoming picture signal S1 is obtained in the adder 8 and this picture signal is supplied to a frame memory 9. The frame memory 9 delays the input picture signal by a one-frame period.

A motion vector detection circuit 10 receives the picture signal of the incoming frame from the blocking circuit 2, receives also the picture signal of the previous frame from the frame memory 9 and calculates the motion vector between the frames for each macro-block as the unit. A picture shift circuit 11 shifts the picture stored in the frame memory 9 by the quantity corresponding to the motion vector and then supplies the shifted picture to a difference circuit 12. Thus, the difference circuit 12 is enabled to obtain the frame difference signal S2 being close to zero and, thereby, the quantity of information is greatly reduced.

The frame difference signal S2 thus obtained is subjected to a DCT transform in a subsequent DCT circuit 4 and, thereby, it is transformed from information about the spatial axes to information about the frequency axes. As a result, the spatial redundancy is reduced. The output of the DCT circuit 4 is quantized in the subsequent quantization device 5 such that it satisfies the condition for a desired bit rate. The encoder 1 sends out the quantized data S3 thus obtained to a variable length coding circuit 13.

Variable length coded data S4 obtained by means of the variable length coding circuit 13 is given, as needed, an error correcting code in a subsequent error correcting code adding circuit 14 and, thereafter, the data is transmitted over a predetermined transmission line or recorded on a predetermined recording medium by means of such a recording apparatus as a digital VTR and a video disk apparatus.

In the encoder 1 of the above described type, the quantization device 5 is adapted to be controlled such that the variable length coded data S4 satisfies the condition for a desired bit rate. When the encoder 1 is used in a transmission system, for example, the quantization device 5 is continuously controlled so that a buffer (not shown) at the output stage may not overflow with the data.

On the other hand, when the encoder 1 is used in a recording apparatus such as a digital VTR, since such a recording apparatus uses a relatively small data unit having a plurality of macro-blocks combined into a packet called a sync block as the minimum unit in the recording and reproduction, the quantization device 5 is controlled so that the variable length coded data S4 may not overflow the sync block.

The sync block is formed of ten to several tens of macro-blocks combined into a packet and given such information as the block number and sync pattern. Further, the quantities of data placed in each of the sync blocks are adapted to be equal with one another. The reason why the sync block is formed of such a relatively small data unit is because it ensures detection of sync blocks at the time of high speed reproduction, such as shuttling, and it also reduces erroneous transmission.

In the case of transmission systems, the combination of blocks subjected to variable length coding does not produce much trouble because the buffer is large enough, but in the case of recording apparatuses, the sync block cannot be made so large and, therefore, the combination of blocks for structuring the sync block becomes an important problem.

For example, the case where sync blocks #0–#3 are structured as shown in FIG. 6 will be considered. In the case of FIG. 6, each of the sync blocks #0–#3 is formed of one macro-block as the unit, i.e., the sync block #0 is formed of the macro-block MB0, the sync block #1 is formed of the macro-block MB1, . . . Now, let us consider a picture of which the upper half is depicting the sky and the lower half is depicting a field of flowers. If it is assumed that the portion of the sky is assigned to the macro-blocks MB0 and MB1 and the portion of the field of flowers is assigned to the macro-block MB2 and MB3, since it is necessary that the quantities of data placed in each of the sync blocks are equal with one another, it follows that fine quantization is applied to the data placed in the sync blocks #0 and #1, while coarse quantization is applied to the data placed in the sync blocks #2 and #3. As a result, there arises a problem that the picture packeted into the sync blocks #2 and #3 deteriorates in picture quality.

Therefore, from the point of view of the quality of picture, it is desired that the sync block is formed of blocks gathered from different positions all over the screen (i.e., to shuffle the blocks). The reason is that, when the portion easy to compress and the portion difficult to compress are unevenly distributed on the screen as in the case where the upper half of the screen is depicting the sky and the lower half is depicting a field of flowers, if some sync blocks are formed only of the macro-blocks from the portion easy to compress, very fine quantization will be made for the sync blocks and, hence, the picture quality will become good. However, since other sync blocks are formed of only the macro-blocks from the portion difficult to compress, very coarse quantization will be made for these sync blocks and deterioration in the picture quality in these sync blocks will become conspicuous.

If, then, sync blocks are formed of macro-blocks gathered from here and there on the screen, equalization can be achieved to a certain degree and, therefore, it can be expected that deterioration in the picture quality due to quantization will become less than that in the case where sync blocks are formed of adjoining macro-blocks. However, since each macro-block is originally formed of a luminance signal Y and color difference signals located correspondingly to the luminance signal Y on the screen, it can be said that they are formed of blocks which are virtually equal with one another in difficulty in the compressing. As a result, there has been a problem that the effect of the averaging is lowered.

Further, when sync blocks are formed in units of macro-blocks as described above, there also arises such a problem that pictures well reproduced cannot be obtained at the time of high speed reproduction, such as shuttling reproduction, because of the block size being large.

SUMMARY OF THE INVENTION

It is an object of the present invention to provide a method of and an apparatus for processing picture signal capable, in subjecting a color signal to a compression coding process and packeting the thus obtained compressed picture data into sync blocks for transmission or recording, of greatly reducing deterioration in the quality of picture due to quantization.

According to one aspect of the present invention, there is provided a method of processing a picture signal, generating sync blocks as unit blocks in signal recording or transmission by compression coding the picture signal and packeting the obtained compressed picture data, comprising: a macro-block generation step of generating macro-blocks by combining a plurality of sub-blocks, serving as the minimum unit blocks for the signal compression, extracted from an incoming picture signal; a picture signal compression step of compressing the incoming picture signal while making motion compensation for each of the macro-blocks as the unit; a sync block generation step of generating the sync blocks by distributing a plurality of sub-blocks contained in the same macro-block of the macro-blocks compressed in the picture signal compression step to different sync blocks; and a quantization control step of controlling quantizing characteristics in the picture signal compression step such that the data quantity in each of the sync blocks become equal with one another.

According to other aspect of the present invention, there is provided an apparatus for processing a picture signal, generating sync blocks as unit blocks in signal recording or transmission by compression coding the picture signal and packeting the obtained compressed picture data, comprising: macro-block generation means for generating macro-blocks by combining a plurality of sub-blocks serving as the minimum unit blocks for the signal compression, extracted from an incoming picture signal; picture signal compression means for compressing the incoming picture signal while making motion compensation for each of the macro-blocks as the unit; sync block generation means for generating the sync blocks by distributing a plurality of sub-blocks contained in the same macro-block of the macro-blocks compressed by the picture signal compression means to different sync blocks; and quantization control means for controlling quantizing characteristics in the picture signal compression means such that the data quantity in each of the sync blocks becomes equal with one another.

A plurality of sub-blocks, contained in the same macro-block are distributed to different sync blocks. By forming such sync blocks, blocks difficult to quantize and blocks easy to quantize can be dispersedly distributed to the sync blocks in fine units and, thereby, the sync blocks can be averaged so as to have flatness at a high level.

As a result, when quantization is performed such that the quantity of data in the sync blocks are equal with one another, deterioration in the quality of picture due to quantization can be reduced.

BRIEF DESCRIPTION OF THE DRAWINGS

FIGS. 1, 1A and 1B are a block diagram showing an embodiment of an encoder to which a method of picture signal processing of the invention is applied;

FIGS. 4, 4A and 4B are a block diagram showing a bit reduction encoder provided with functions for motion compensation and DCT processing of a related art;

FIG. 6 is a schematic diagram explanatory of generation of sync blocks in a related art.

DETAILED DESCRIPTION OF THE PREFERRED EMBODIMENTS

Figure 4B:
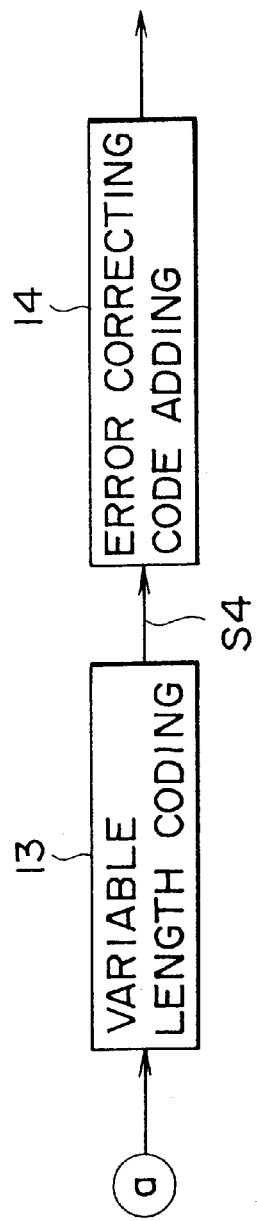
Figure 4:
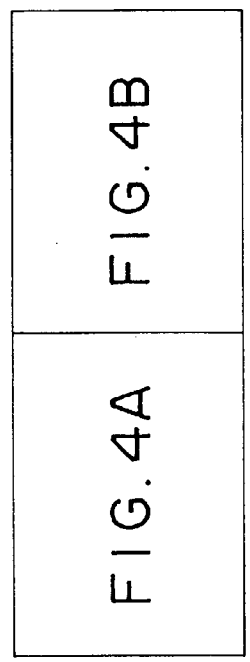
Figure 5:
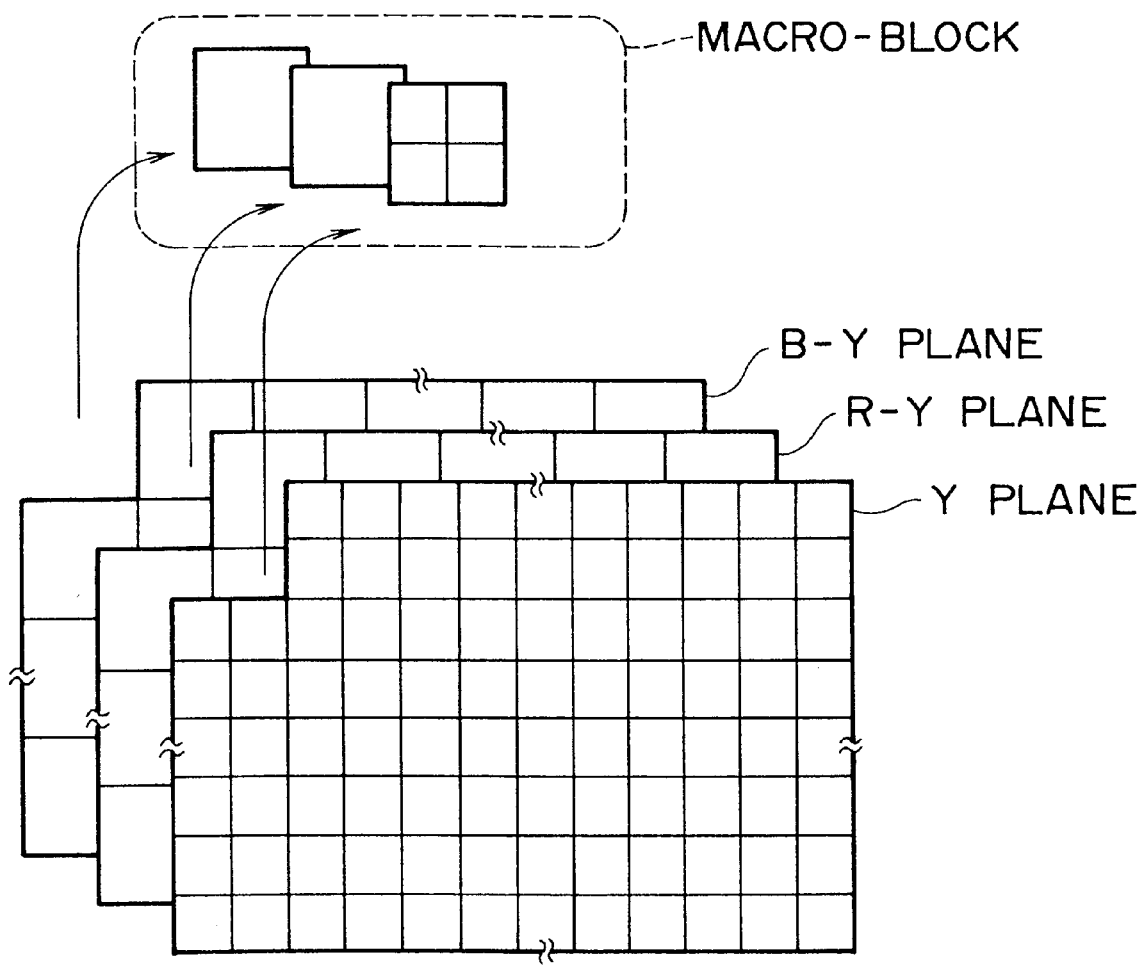
FIG. 5 is a schematic diagram explanatory of structure of macro blocks.

Referring to FIG. 1, in which corresponding components to those in FIG. 4 are denoted by corresponding reference numerals, reference numeral 20 denotes the whole of an encoder to which the invention is applied.

An incoming picture signal S1 is input to a blocking circuit 2 in which macro-blocks are formed by combining pluralities of DCT blocks. At this time, the blocking circuit 2 first forms the DCT blocks, each thereof being made up of 8 pixels×8 lines of each of planes of the luminance signal Y and the color difference signals R–Y and B–Y and then forms the macro-blocks by combining, for each macro-block, four adjoining DCT blocks of the luminance signal and one each DCT block of the color difference signals R–Y and B–Y located correspondingly to the luminance signal Y.

The encoder 20 calculates, in a subsequent difference signal calculating portion 3, a frame difference signal S2 between the incoming frame and the previous frame, while making motion compensation for each macro-block as the unit. The difference signal calculating portion 3 supplies quantized data S3 output from a quantization device 5 to an adder 8 through a inverse-quantization device 6 and a inverse-DCT circuit 7. The adder 8 is also supplied with the output of a picture shift circuit 11. Thereby, a picture signal the same as the incoming picture signal S1 can be obtained in the adder 8 and the picture signal is supplied to a frame memory 9. The frame memory 9 delays the input picture signal by a one-frame period.

A motion vector detection circuit 10 receives the picture signal of the incoming frame from the blocking circuit 2 and at the same time receives the picture signal of the previous frame from the frame memory 9 and calculates the motion vector between the two frames for each macro-block as the unit. The picture shift circuit 11 shifts the picture stored in the frame memory 9 by the quantity corresponding to the motion vector and supplies the shifted picture to a difference circuit 12. Thus, the difference circuit 12 is enabled to obtain the frame difference signal S2 whose value is close to zero and, hence, the quantity of the information is greatly reduced.

The frame difference signal S2 thus obtained is subjected to a DCT transform in the subsequent DCT circuit 4 to be transformed from information about spatial axes to information about frequency axes. As a result, the spatial redundancy is reduced. The output of the DCT circuit 4 is quantized by the subsequent quantization device 5 so as to satisfy the condition for a desired bit rate.

Further, the encoder 20 has a macro-block shuffling circuit 21 and a quantization control circuit 22 for controlling the quantizing characteristics of the quantization device 5 in response to the shuffling operation performed in the macro-block shuffling circuit 21.

The macro-block shuffling circuit 21 decomposes macro-blocks back to DCT blocks and composes sync blocks by combining DCT blocks contained in different macro-blocks. The macro-block shuffling circuit 21, at this time, distributes, as shown in FIG. 2, the luminance signal DCT blocks Y (0–3) contained in each of the macro-blocks MB0–MB3 to different sync blocks #0–#3 and further distributes a set of the color difference signal DCT blocks R–Y and B–Y contained in each macro-block MB0–MB3 to each of the sync blocks #0–#3.

Figure 2:
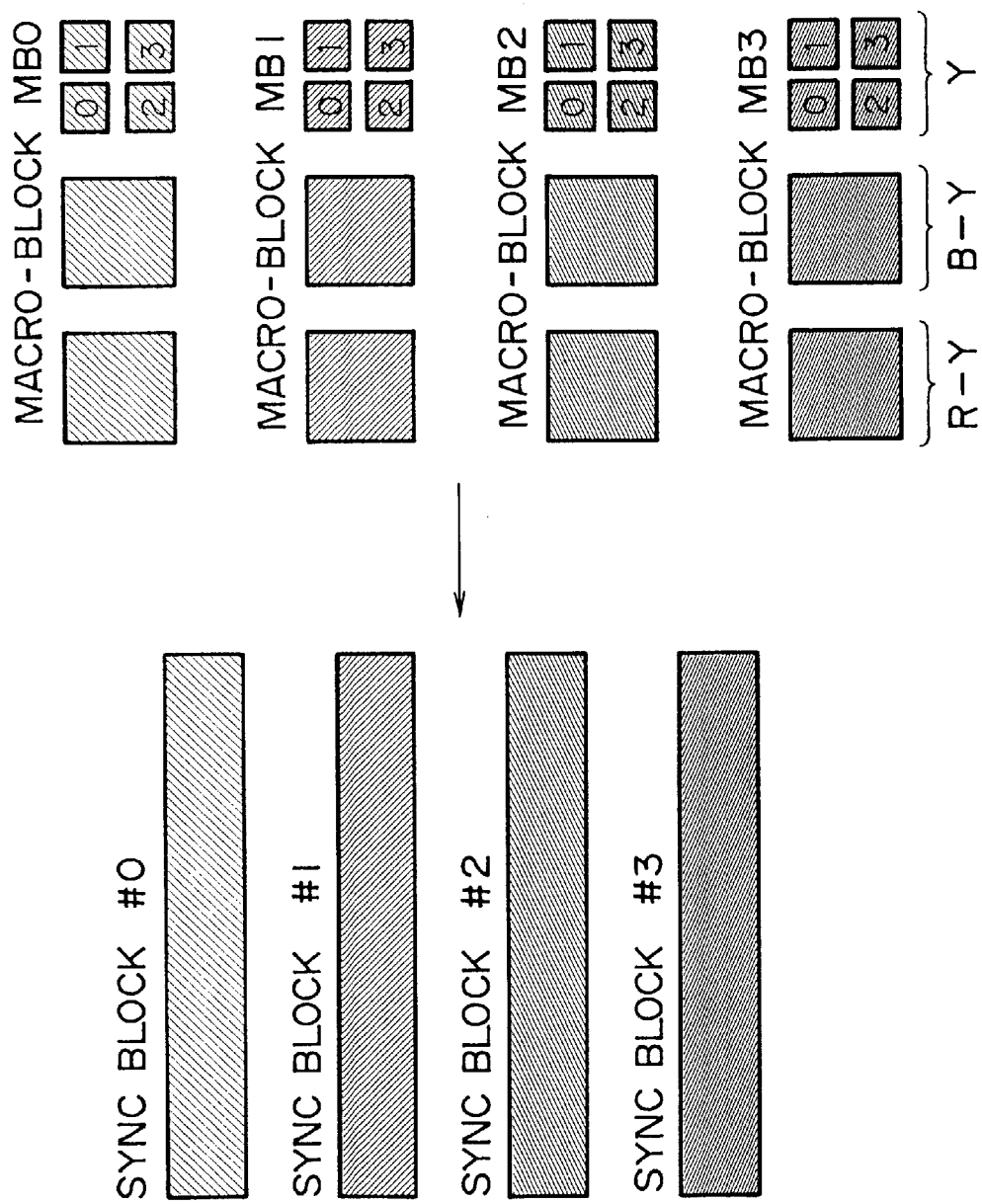
FIG. 2 is a schematic diagram explanatory of generation of sync blocks according to the embodiment.

More specifically, referring to FIG. 2, the luminance signal DCT block Y (0–3) and the color difference signal DCT blocks R–Y and B–Y contained in each of the macro-blocks MB0–MB3 are distributed to the sync blocks #0–#3 as indicated by the corresponding oblique lines. The number of the DCT blocks in each sync block at this time is made equal with one another.

The quantization control circuit 22 receives the DCT data from the DCT circuit 4 and virtually generates sync blocks by making virtual shuffling in the same manner as in the macro-block shuffling circuit 21. The quantization control circuit 22 outputs a quantization controlling signal S10 to the quantization device 5 so that, when the sync blocks as described above with reference to FIG. 2 are generated, the data quantity in each of the sync blocks #0–#3 may become equal with one another.

The quantization device 5, while switching the quantizing characteristics such as the quantizing bit number and quantizing step width in response to the quantization controlling signal S10, quantizes the DCT data input thereto. Output data S12 of the macro-block shuffling circuit 21 is variable length coded by a variable length coding circuit 13. The variable length coded data is given an error correcting signal by an error correcting signal adding circuit 14 and then transmitted over a transmission line or recorded on a recording medium by a recording apparatus.

Thus, in the encoder 20, the shuffling is made in units of the DCT blocks smaller than the macro-block, and thereby it is made possible to distribute the flatness component of the picture signal in smaller units to each of the sync blocks. As a result, the sync blocks can further be averaged in terms of flatness. Therefore, when quantization is performed such that data quantities of the sync blocks become equal with one another, the picture quality can be prevented from deteriorating due to difference in flatness between the sync blocks.

In concrete terms, even when the macro-blocks MB0 and MB1 are blocks depicting the sky (i.e., blocks having a greater degree of flatness) and the macro-blocks MB2 and MB3 are blocks depicting a field of flowers (i.e., blocks having a smaller degree of flatness), for example, the encoder 20 can structure averaged sync blocks #0–#3 and, hence, sync blocks #0–#3 which are not so much different in the state of quantization can be generated.

If, here, the color difference signal DCT blocks R–Y and B–Y are also distributed to different sync blocks, such a thing will happen that either the color difference signal DCT block R–Y or B–Y can only be taken in when blocks are intermittently extracted in the case, for example, of varied speed reproduction in a digital VTR. In such case, the hue will rotate and the picture quality will be deteriorated. Therefore, in the encoder 20, the color difference signals R–Y and B–Y in the same macro-block are distributed to one and the same sync blocks #0–#3 and thereby deterioration in the picture quality due to rotation of the hue is avoided.

In the case of the embodiment, the macro-block shuffling circuit 21 distributes the DCT blocks included in each macro-block to a plurality of sync blocks following the below mentioned rule, in which the total number of the macro-blocks in one screen is denoted by mm, the total number of the sync blocks therein is denoted by SS, and the number of the DCT blocks of luminance signal Y contained in one macro-block is denoted by nn. As a matter of course, mm can be divided by SS without a remainder.

For the sake of explanation, the luminance signal DCT blocks contained in one macro-block will be given numbers in the descending order from the upper left to the lower right, from left to right in each line. Accordingly, the luminance signal DCT blocks contained in one macro-block have the numbers from 0 to nn−1.

The macro-block shuffling circuit 21 distributes both of the color difference signal blocks R–Y and B–Y of the i-th macro-block and the luminance signal DCT block o of the same to the (mm mod SS)-th sync block and distributes the luminance signal DCT block j of the i-th macro-block to the ((SS×(j/i)+mm) mod SS)-th sync block, where mod denotes an operator for obtaining the remainder.

FIG. 2 shows the case where SS=mm=nn=4. Namely, with respect to the macro-block MB2 in FIG. 2, the color difference signal blocks R–Y and B–Y and the upper left luminance signal block 0 yield (4×(0/4)+2)=2 and, hence, these blocks are distributed to the sync block #2. Since the upper right luminance signal block 1 yields (4×(1/4)+2) mod 4=3, the luminance signal block 1 is distributed to the sync block #3. Since the lower left luminance signal block 2 yields (4×(2/4)+2) mod 4=0, the same is distributed to the sync block #0. Likewise, since the lower right luminance signal block 3 yields (4×(3/4)+2) mod 4=1, the same is distributed to the sync block #1. Further, with respect to the macro-block MB3, the color difference signal blocks R–Y and B–Y and the upper left luminance signal block 0 yield (4×(0/4)+3) mod 4=3 and, hence, these blocks are distributed to the sync block #3. By having similar operations performed, the sync blocks #0–#3 as shown in FIG. 2 can be generated.

Figure 3:
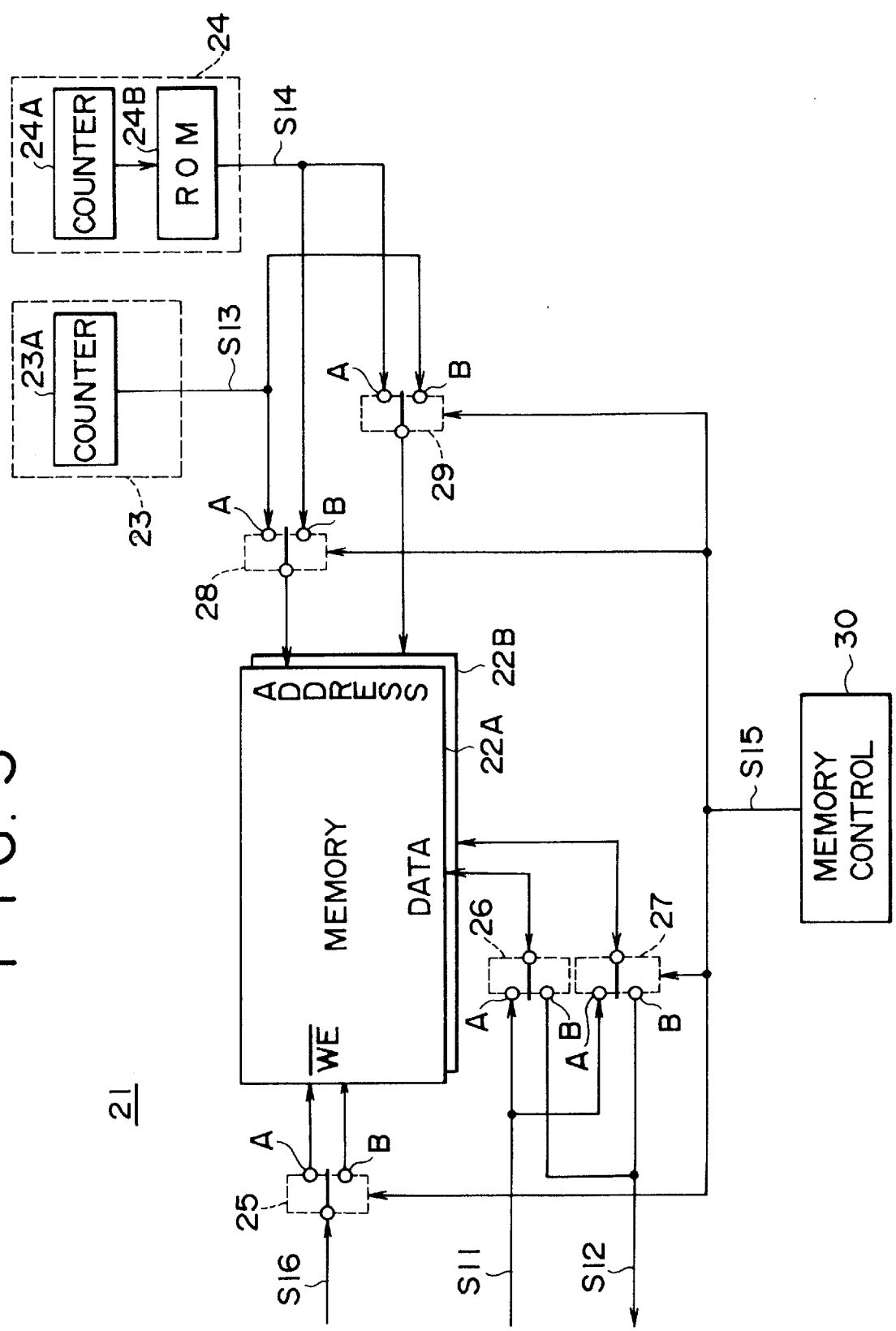
FIG. 3 is a block diagram showing a circuit configuration of a macro-block shuffling circuit according to the embodiment.

In practice, the macro-block shuffling circuit 21 is structured as shown in FIG. 3. Namely, the macro-block shuffling circuit 21 is adapted to selectively store supplied quantized data S11 to a memory 22A or a memory 22B.

The macro-block shuffling circuit 21 is, thereby, enabled to cause one of the memories 22A and 22B to perform write operation and, in the meantime, cause the other of the memories 22A and 22B to perform read operation, and thus high speed write and read operations can be achieved without increasing the clock frequency.

The macro-block shuffling circuit 21 writes quantized data S11 at the address specified by a write address generator 23. The write address generator 23 has a counter 23A increasing its count value in synchronism with the input timing of the quantized data S11 and resetting the count value when it has reached the maximum address in the memories 22A and 22B and outputs the count value of the counter 23A to the memories 22A and 22B as the write address specifying signal S13.

Further, the macro-block shuffling circuit 21 reads the quantized data S11 stored in the memories 22A and 22B according to the address specified by a read address generator 24. The read address generator 24 is formed of a counter 24A and a ROM (Read Only Memory) 24B, which generates a read address specifying signal S14 for the memories 22A and 22B according to the count value output from the counter 24A.

Here, the ROM 24B stores such data that has the addresses for the shuffling described in FIG. 2 mapped therein and, hence, shuffled data S12 consisting of the sync blocks #0–#3 as shown in FIG. 2 are read out from the memories 22A and 22B. More specifically, in the macro-block shuffling circuit 21 of the embodiment, it is adapted such that the above described shuffling for each DCT block as the unit is performed at the time when data are read out of the memories 22A and 22B.

The macro-block shuffling circuit 21 controls the write and read operations by changing over connections of switchers 25–29 according to a control signal S15 output from a memory controller 30.

More specifically, when the quantized data S11 is to be written into the memory 22A and the shuffled data S12 is to be read out of the memory 22B, the switchers 25, 26, and 28 are connected to terminals A so that a write enable signal S16, the quantized data S11, and a write address specifying signal S13 are supplied to the memory 22A and, at the same time, the switchers are connected to terminals B so that the read address specifying signal S14 is supplied to the memory 22B and the shuffled data S12 is output.

On the other hand, when the quantized data S11 is to be written into the memory 22B and the shuffled data S12 is to be read out of the memory 22A, the switchers 25, 26, and 28 are connected to the terminals B so that the write enable signal S16, the quantized data S11, and the write address specifying signal S13 are supplied to the memory 22B and, at the same time, the switchers 29 and 27 are connected to the terminals A so that the read address specifying signal S14 is supplied to the memory 22A and the shuffled data S12 is output.

In the above described structure, the encoder 20 applies the motion compensation and DCT processing to the incoming picture signal S1 for each macro-block as the unit and, thereby, performs the picture signal compression process in which increase in the quantity of information due to motion vector components is suppressed.

From the thus obtained quantized data S11 in units of macro-blocks, the encoder 20 generates the sync blocks as the minimum units in recording/reproduction or transmission. In obtaining the sync blocks at this time, the encoder 20 shuffles the quantized data for each DCT block as the unit.

As a result, the flatness components in the picture can be distributed in very fine units to each of the sync blocks. Accordingly, the sync blocks are well equalized with one another in terms of flatness. Thus, it is prevented that the sync blocks containing only portions with large flatness or only portions with small flatness are generated and, therefore, when the quantization is performed so that the quantities of data in the sync blocks are equal with one another, the deterioration in the picture quality due to difference in flatness between sync blocks can be prevented from occurring.

In the case of the digital VTR, the compression coded data packeted into sync blocks are converted by a specific signal processor (not shown) to data in a signal format recordable on a magnetic tape and recorded in units of sync blocks by a magnetic head. In the reproduction, the DCT blocks distributed among different sync blocks are put together so that the macro-blocks are reconstructed and, then, reproduced pictures are obtained using the motion vectors recorded for each macro-block as the unit.

According to the above described design, since sync blocks are generated after the macro-blocks have been decomposed and shuffling has been carried out for the DCT blocks as the units, quantization deterioration of the picture quality due to concentration of the flatness can be avoided.

As the result of the above described processing, a higher degree of distribution of the flatness can be achieved than in the case where sync blocks are generated through shuffling macro-blocks as the units. Therefore, deterioration in the picture quality due to quantization can be reduced even when the sync block is formed of a small data unit. Thus, owing to the capability of generating smaller sync blocks of the embodiment, the number of sync blocks that can be extracted from the record when high speed reproduction is performed in the digital VTR can be increased and the quality of the reproduced picture can be improved.

Although, in the above embodiment, the case where sync blocks to be generated in the macro-block shuffling circuit 21 are virtually generated by the quantization control circuit 22 and the quantizing characteristics of the quantization device 5 are controlled so that the data quantities of the sync blocks may become equal with one another, the invention is not limited to such design but the quantizing characteristics of the quantization device 5 may be feedback controlled such that the data quantities in the sync blocks will become equal with one another by having the variable length coded data output from the variable length coding circuit 13 monitored. Further, the quantizing characteristics may be controlled by providing the quantization device 5 itself with the function to virtually generate sync blocks.

Although, in the above embodiment, the case has been described in which the frame difference signal compressed by means of the DCT circuit 4 and the quantization device 5 is locally decoded by means of the inverse-quantization device 6 and the inverse-DCT circuit 7 for providing the motion compensation, the invention is not limited to such a design but the motion compensation may be made by directly using the frame difference signal S2 itself output from the difference circuit 12. In this case, the inverse-quantization device 6 and inverse-DCT circuit 7 can be omitted.

Although, in the above embodiment, the case where the frame difference signal is obtained from the previous frame has been described, the method to obtain a frame difference signal from the subsequent frame or the method to obtain a frame difference signal using both the previous and the subsequent frames may be employed.

Although, in the above embodiment, the case where the read address generator 24 in the macro-block shuffling circuit 21 is provided with the ROM 24B generating the read address specifying signal S14 in accordance with the shuffling and, thereby, the shuffling is made at the time of data reading has been described, the invention is not limited to such a design but the shuffling may be made at the time of data writing by providing the ROM 24B on the output side of the counter 23A in the write address generator 23.

Although, in the above embodiment, the case where two color difference signal blocks R–Y and B–Y contained in the same macro-block are distributed to the same sync block has been described, it may be adapted such that the color difference signal blocks R–Y and B–Y are also distributed to different sync blocks.

Although, in the above embodiment, the case where a macro-block is formed of four luminance signal DCT blocks and two color difference signal blocks located corresponding to the luminance signal DCT blocks has been described, the constituents of the macro-block are not limited to them but combination of various DCT blocks may be employed.

Further, the way of distributing the DCT blocks contained in the macro-blocks to the sync blocks are not limited to that described in the above embodiment. What is needed is to distribute a plurality of sub-blocks contained in the same macro-block to difference sync blocks.

Although, in the above embodiment, the case where DCT is used for the transform coding has been described, the invention is not limited to it. The invention can be applied to such types of transform coding as wavelet transform, LOT (Lapped Orthogonal Transform), and Hadamard transform, and thus it can be widely applied to cases where a picture signal is transform coded in units of sub-blocks.

Although, in the above embodiment, the case where the method of and apparatus for picture signal processing of the invention are applied to the recording system in the digital VTR has been described, the use of the invention is not limited to that but it can be applied to such systems as the recording system in video disk apparatuses and the transmission system in picture signal transmission apparatuses, such as the television telephone system. In short, the invention can be widely applied to apparatuses recording or transmitting compressed picture data packeted into sync blocks.

According to the invention, as described above, when compressed color data is to be packeted into sync blocks, the sync blocks are generated by having a plurality of sub-blocks contained in the same macro-block distributed to different sync blocks. Therefore, the blocks difficult to quantize and the blocks easy to quantize can be dispersedly distributed among different sync blocks and, therefore, deterioration in the quality of picture due to quantization can be largely reduced.

What is claimed is:

1. A method of processing a picture signal, comprising:
generating macro-blocks by combining a plurality of sub-blocks of an incoming picture signal;
compressing said incoming picture signal including motion compensation for each of said macro-blocks and quantization of each of said macro-blocks to Produce compressed macro-blocks;
generating sync blocks for use in signal recording or transmission by distributing each of the sub-blocks included in each of the compressed macro-blocks to different sync blocks; and
controlling quantizing characteristics of the quantization of each of the macro-blocks in the compressing step such that a data quantity of each of said generated sync blocks is substantially the same.

2. A method of processing a picture signal according to claim 1, wherein:
each of said sub-blocks is comprised of luminance signal blocks and color difference signal blocks;
said macro-block generation step is carried out by combining a plurality of luminance signal blocks and two corresponding color difference signal blocks; and
said sync block generation step is carried out by distributing each of said luminance signal blocks included in one of said compressed macro-blocks to different sync blocks and by distributing said two color difference signal blocks included in said compressed macro-block to the same sync block.

3. A method of processing a picture signal according to claim 1, wherein
when the total number of said macro-blocks in one screen is denoted by A and the total number of said sync blocks in one screen is denoted by B, the j-th sub-block of a plurality of sub-blocks contained in the i-th ($0 < i \leq A$) macro-block is distributed, in said sync block generation step, to the C-th (0<C≦B) sync block given by C={B×(j/i)+A} mod B, where mod is an operator for obtaining the remainder.

4. An apparatus for processing a picture signal, comprising:

macro-block generation means for generating macro-blocks by combining a plurality of sub-blocks of an incoming picture signal;

picture signal compression means for compressing said incoming picture signal including motion compensation for each of said macro-blocks and quantization of each of said macro-blocks to produce compressed macro-blocks;

sync block generation means for generating sync blocks for use in signal recording or transmission by distributing each of the sub-blocks included in each of the compressed macro-blocks to different sync blocks; and quantization control means for controlling quantizing characteristics of the quantization of each of said macro-blocks in said picture signal compression means such that a data quantity of each of said generated sync blocks is substantially the same.

5. An apparatus for processing a picture signal according to claim 4, wherein:

each of said sub-blocks is comprised of luminance signal blocks and color difference signal blocks;

said macro-block generation means generates said macro-blocks by combining a plurality of luminance signal blocks and two corresponding color difference signal blocks; and said sync block generation means generates said sync blocks by distributing each of said luminance signal blocks included in one of said compressed macro-blocks to different sync blocks and by distributing said two color difference signal blocks included in said compressed macro-block to the same sync block.

6. An apparatus for processing a picture signal according to claim 4, wherein said sync block generation means, when the total number of said macro-blocks in one screen is denoted by A and the total number of said sync blocks in one screen is denoted by B, distributes the j-th sub-block of a plurality of sub-blocks contained in the i-th (0<i≦A) macro-block to the C-th (0<C≦B) sync block given by C={B×(j/i)+A} mod B, where mod is an operator for obtaining the remainder.

* * * * *